March 5, 1957 R. SEWIG 2,783,696

FLASH LAMP EQUIPMENT

Filed June 3, 1952 7 Sheets-Sheet 1

INVENTOR.
RUDOLF SEWIG

BY Mock + Blum

ATTORNEYS

INVENTOR.
RUDOLF SEWIG
BY Mock + Blum
ATTORNEYS

March 5, 1957 R. SEWIG 2,783,696

FLASH LAMP EQUIPMENT

Filed June 3, 1952 7 Sheets-Sheet 3

44
40
13
43
14
16
37
15

INVENTOR
Rudolf SEWIG

BY Mock & Blum

ATTORNEYS

FLASH LAMP EQUIPMENT
Filed June 3, 1952 7 Sheets-Sheet 4
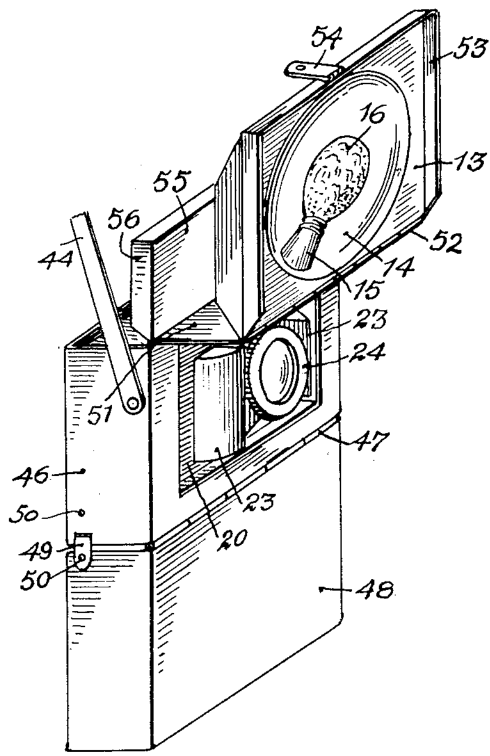
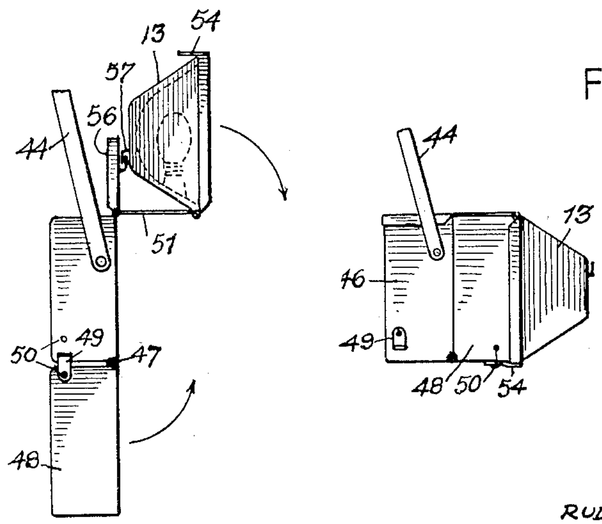
INVENTOR.
RUDOLF SEWIG
BY Mock + Blum
ATTORNEYS

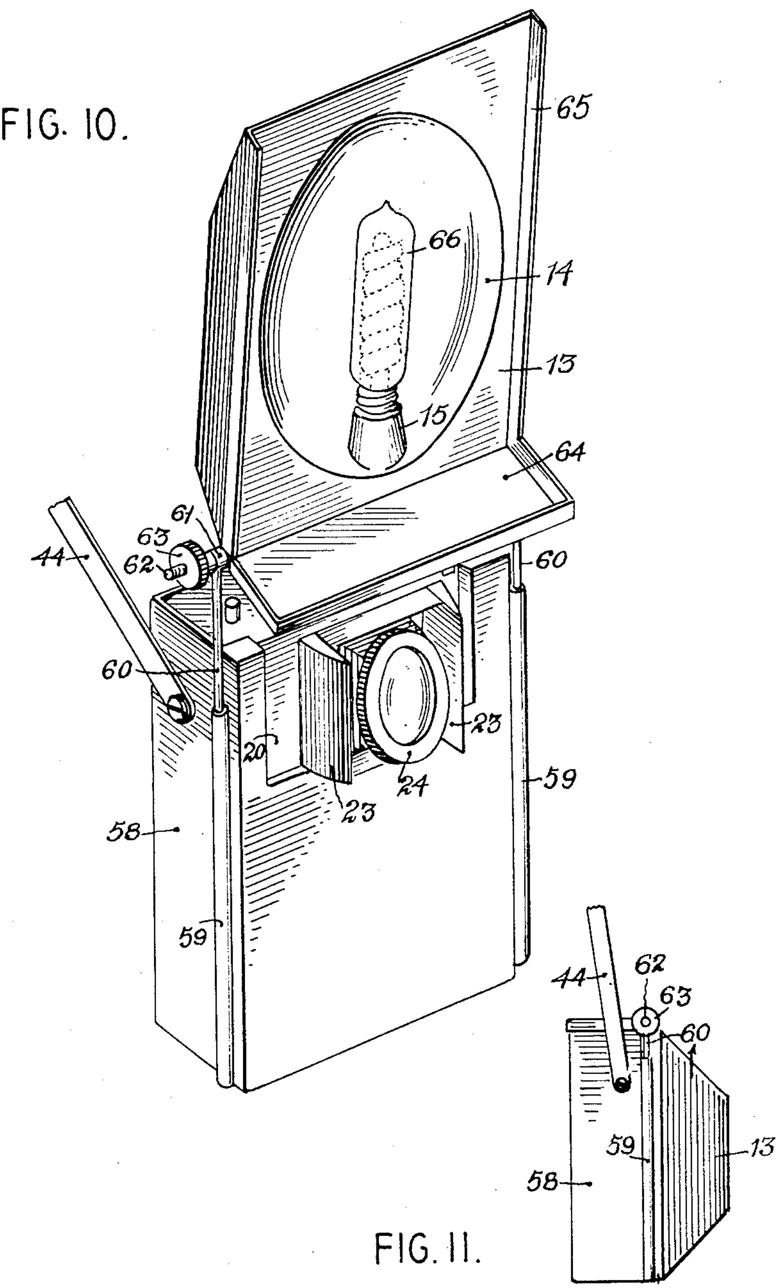
INVENTOR.
RUDOLF SEWIG
BY Mock & Blum
ATTORNEYS

FIG. 12.
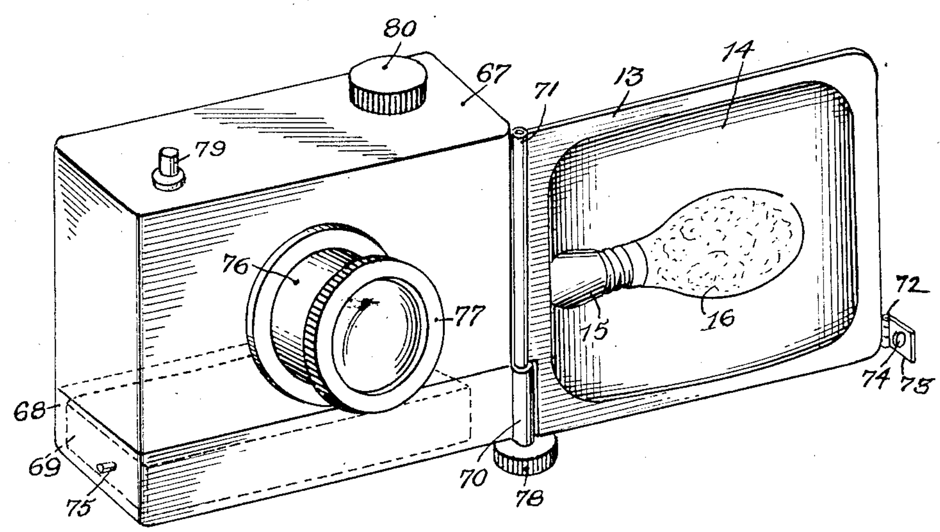
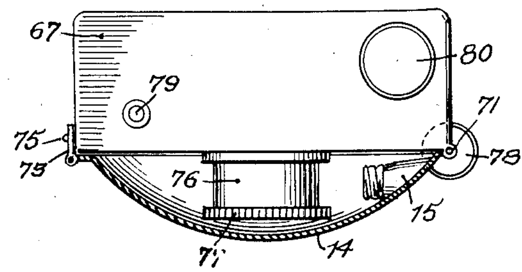
FIG. 13.
INVENTOR.
RUDOLF SEWIG
BY Mock + Blum
ATTORNEYS FLASH LAMP EQUIPMENT
Filed June 3, 1952 7 Sheets-Sheet 7
FIG. 14.
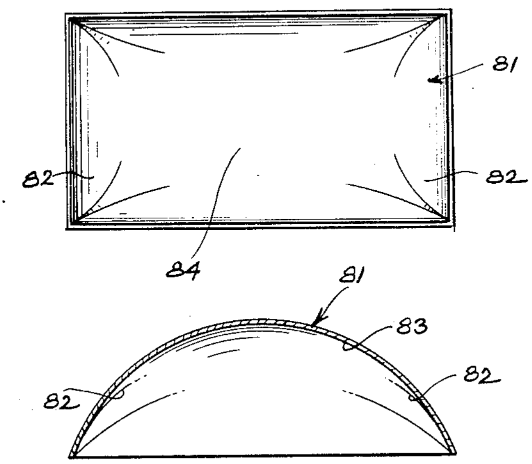
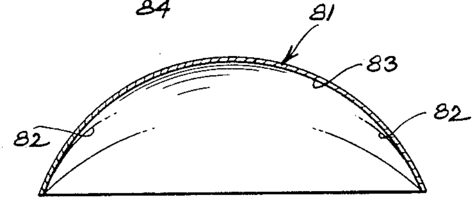
FIG. 15.
FIG. 17.
FIG. 16.
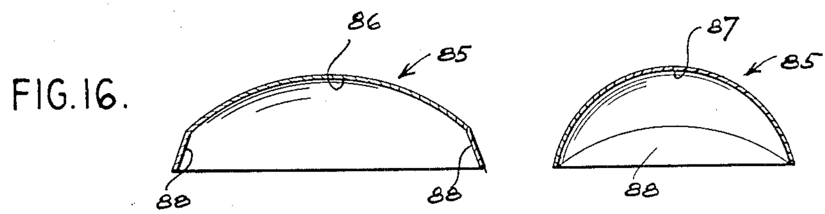
FIG. 18.
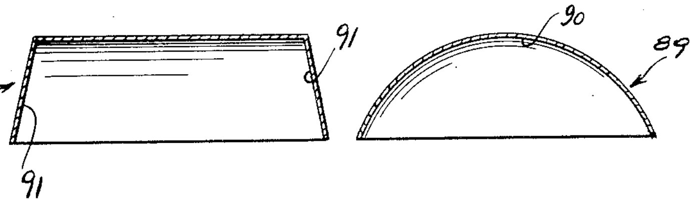
FIG. 19.
INVENTOR.
RUDOLF SEWIG
BY Mock + Blum
ATTORNEYS United States Patent Office 2,783,696

Patented Mar. 5, 1957

2,783,696

FLASH LAMP EQUIPMENT

Rudolf Sewig, Braunschweig, Germany, assignor to Voigtländer, A. G., Braunschweig, Germany, a corporation of Germany Application June 3, 1952, Serial No. 291,423

Claims priority, application Germany June 23, 1951

7 Claims. (Cl. 95—11)

The present invention relates to a flash-lamp device or equipment which is permanently or temporarily connected with a photographic camera.

The known flash-lamp devices consist, in general, of a unit comprising a container for the battery, reflector, lamp, etc., or of a container comprising a battery and electrical accessory parts, and a lamp holder provided with a reflector, which is separated from said container and has only electrical connection with the latter.

These known devices are connected with the photographic camera either by fastening the above mentioned flash-lamp unit by means of a holder to the camera, or by having the container for the battery and the lamp holder and reflector separated from the camera, and having only electrical connection between these parts and the camera.

The known design and connection of flash-lamp devices with the photographic camera, is unfavorable to utilization of space and renders the use and transport of this important auxiliary device, difficult.

Owing to the use of cylindrical batteries arranged one above the other, devices comprising vacuum flash-light lamps have, in most cases, the form of a long cylinder, connected with a reflector, and they are held at a certain distance from the camera, whereby the long cylinder and the relatively large reflector extend considerably beyond the camera.

In the case of box-like devices provided with a separate lamp holder, connection of the camera with elements of the flash-lamp device, has not been hitherto suggested, probably in view of the relatively large dimensions of said elements.

According to the present invention, the design and connection of flash-lamp devices of known construction, with a photographic camera is improved by fitting the design of the flash-lamp devices to the camera and closely joining said devices to the camera so that an organic unit is formed which facilitates the use, housing and transport of the flash-lamp device and camera.

According to a particularly useful embodiment of the present invention, the flash-lamp device and camera are combined in a so-called eveready case or the flash-lamp device or its elements, form part of an eveready case.

According to the invention, the flash-lamp device is adapted to cover at least one side of the camera and to directly or indirectly adjoin the camera body and, for taking pictures, is adapted to be moved, relative to the camera, entirely or partly by swinging, or turning, or swinging and turning, to the taking position. The elements of the flash-light device preferably form two structural units preferably flexibly connected by links, one of said units containing the source of current and preferably also additional and switch elements while the other unit contains the lamp socket and the light-collecting organ. The structural units which cover one or more sides of the camera, are fitted to the camera, in general, in two directions.

According to a preferred embodiment, the flash-lamp device is designed in such manner that the light-collecting organ or its carrier covers the front side or rear side of the camera and, if desired, part of the attached flash-light device, in rest position. This design has the advantage that this element, the dimensions of which cannot be reduced beyond certain limits, closely joins the camera in rest position and can be quickly brought to the taking position by a simple step of swinging or the like. If lighting is supposed to be effected from a place other than that of taking the picture, the lamp holder and reflector or the like, must be freely movable. In order to attain this, the element containing the light-collecting organ, or the reflector alone, should be separably connected with the flash-lamp device or with the eveready case or with the camera.

The structural group containing the source of current, and in most cases, also other electrical parts, is preferably arranged on a narrow side of the camera. One of the longer narrow sides of the camera, for example, the lower side, is particularly suitable for this purpose. Any suitable battery or accumulator can be used as the source of current. In vacuum flash-lamps, in general, the conventional cylindrical batteries can be used. The use of the so-called flat batteries has particular advantages. These batteries are of relatively small size and have a relatively high voltage, for example 22 volts, so that in their use, the dimensions of the flash-lamp device can be kept relatively small. According to a preferred embodiment, a flat lower member can be arranged, for example, under the camera for receiving one or more of said flat batteries and, if desired, also other accessory parts. In the flash-light device or equipment according to the present invention, any suitable accessory parts of known flash light equipments can be used, for example, the battery or charger condenser, and the like, in the case of vacuum flash light, and direct current source, condenser, ignition accessories and other known means in the case of discharge flash tubes.

It is of particular advantage to arrange the flash light device or equipment or parts of the same, as parts of a suitable carrying case, preferably an eveready case, or to combine the flash light device or parts thereof with the photographic camera, in such case. This makes it possible to connect the camera with the flash light equipment in such manner that the taking position can be obtained quickly, with all parts of the equipment combined in one single container, and to couple the camera electrically with the flash light equipment simply by inserting it in the case, the electric connection being brought about, for example, by a contact plug or the like. In connecting the carrying case with the flash light equipment, the light-collecting member or its carrier can be used for covering the front side of the camera or the front side of the camera and the adjacent battery element, as a movable front wall of the eveready case. In this case too, the relatively large reflector part lies closely against the camera, in rest position, and can be brought quickly to the taking position. The reflector or its carrier can be used for covering, in addition to the front side of the case, also another side, for example its upper side. Mobility of the light-collecting member or of its carrier can be provided for in various ways; it can be movable by swinging, or shifting, or the like, or by using a combined movement for opening, for example shifting in combination with swinging or turning. The reflector, or its carrier, can be held preferably by a holder comprising telescopically slidable parts.

The light-collecting member can have the known circular shape, in front view, if this is feasible in view of the dimensions of the equipment. However, in order to render said member fitting to the camera, to the flash light equipment, or to the case, or for other reasons, it is advantageous to use a light-collecting member of a symmetric or asymmetric form other than the circular form, in carrying out the invention. This form is preferably selected in a manner which adapts distribution of light to the image field to be illuminated. Such design is of general importance for flash light devices. It is of advantage with regard to the closeness and reduction of dimensions of the total aggregate, if, in closed position of the reflector, in which it lies against the camera, the reflector simultaneously forms a cover which is adapted to house projecting parts, for example, the tube and the objective of the camera, in its hollow space. If this is prevented by the flash bulb, the latter must be removed from the lamp socket. However, the lamp socket can be movable, so that there is space for all parts, if the hollow space of the reflector is sufficiently large.

It has been known to provide in the reflector, in addition to the lamp holder for the flash bulb, a socket for a so-called test bulb, which contains a smaller bulb for indicating whether the device is ready for action. According to the present invention, it is of advantage to provide in or on the light-collecting organ several lamp holders or sockets movably arranged in such manner that the bulbs held by them can be brought alternately into the radiating point of the light-collecting organ. These sockets are adapted to receive either several flash bulbs, for example several similar vacuum flash lamps, one vacuum flash lamp and one discharge flash lamp, or a flash bulb and a so-called pilot or directional lamp which serves for directing the reflector to the object to be photographed. Furthermore, the light-collecting organ, or its carrier, or the flash light device can be provided with a parallax compensation device, which is adjustable relative to the optical axis of the camera, for example by means of a screw drive, or the like. If it is desired to keep the entire flash light equipment or device as small as possible, some, or all, individual electrical elements, such as battery, condenser, etc., forming part of said equipment or device, can be placed in corners of the structural member housing the reflector. In such a case, the flash light device proper, can be arranged closely around the reflector. The eveready case in which the flash light equipment and the camera are combined, is preferably provided with particular hollow spaces, guide spaces, holders, etc., for the electric wires. The flash light equipment can be provided, in the presence or absence of a source of current forming part of the same, with means for connecting it with an electric circuit.

The appended drawings illustrate, by way of example and without limitation, some embodiments of the invention. Certain details, which are not necessary for understanding the invention, have been omitted in the drawings.

In the drawings,

Figure 5 illustrates a flash-lamp device forming part of an eveready case, the reflector serving as shutter element on the front and top of the case, while

Figure 7 shows in perspective view, in open position, a device, the parts of which are designed as foldable elements of an eveready case, said elements serving for covering the front side of the camera; Figure 8 is the side view of a device according to Figure 7, in open position, and Figure 9 shows the same device in folded, i. e. closed position;

Figure 10 illustrates a device, in which the battery-part is housed by the lower part of an eveready case and the reflector, which can be moved by shifting and swinging, serves as a shutter element for the front part and top of the case. Figure 11 is a side-view of the device according to Figure 10, in closed position;

Figure 12 illustrates a tube camera with a flat bottom part for receiving a flat battery; the camera holds a removable reflector, the cavity of which encloses the tube of the camera in closed position;

Figure 13 is a top view of the camera and reflector shown in Figure 12, in closed position. The reflector is shown in section in this figure.

Figure 14 is a summary view of the arched interior part of an elongated reflector;

Figure 15 is a view of the longer side of the reflector according to Figure 14;

Figure 16 is a view of the longer side of another reflector form;

Figure 17 is a view of the shorter side of the reflector according to Figure 16;

Figure 18 illustrates a trough-shaped reflector viewed toward the elongated side, while Figure 19 is a side view of the same reflector.

Figure 3:
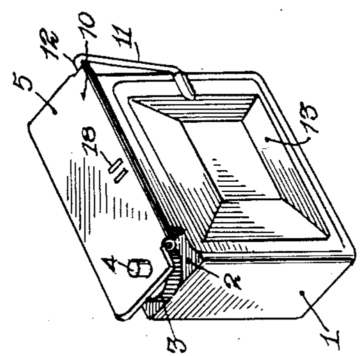
Figure 3 shows the flash-lamp device without the camera.
Figure 2:
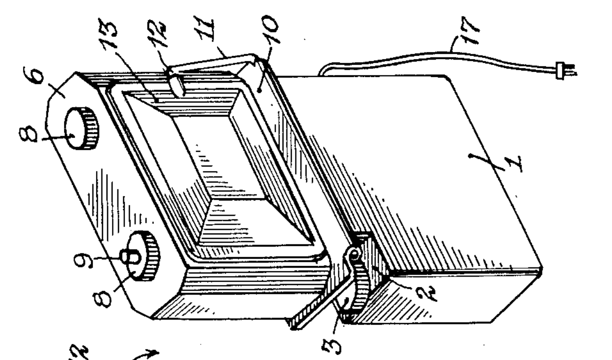
Figure 2 illustrates the arrangement shown in Fig. 1, the reflector being swung to and adjoining the front side of the camera.
Figure 1:
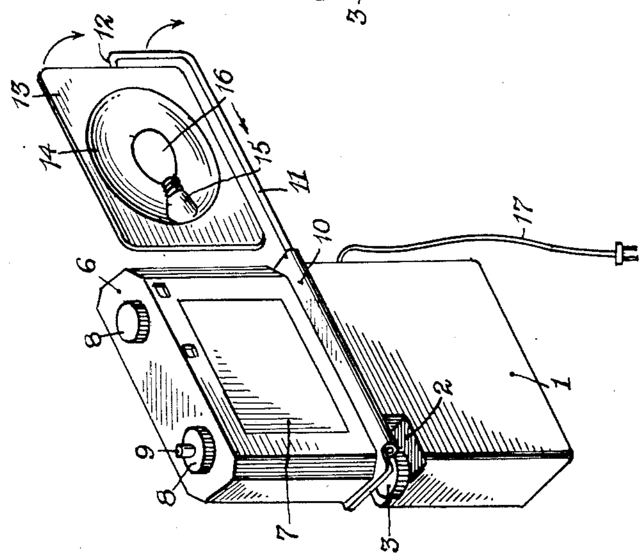
Figure 1 illustrates, in perspective view, a flash-lamp arrangement and a camera connected therewith, the flash-lamp being in taking position in the reflector.

Referring now to the drawings in detail, Figures 1, 2 and 3 illustrate a flash-lamp device, which can be connected with a photographic camera. A container 1 houses the conventional accessories, such as battery, condenser, resistance, etc., which are not shown in the drawing. Container or casing 1 is provided with a cut-out at 2, adapted to receive a small knurled wheel 3 forming the head of a screw, the threaded part 4 of which passes through the upper cover plate 5 of the casing and serves for fastening camera 6 to the casing 1. Camera 6 is shown with closed cover 7 in Figure 1. The film spool knobs are shown at 8 and the release knob at 9. A tube 10 is arranged at the front edge of cover plate 5 of the casing. A bent tube 11 is housed by and displaceable in tube 10, and this tube 11 contains electric wires, not shown, for connecting the flash lamp with the source of current. Plate-shaped reflector carrier 13 is rotatably fastened to bent end 12 of tube 11. Reflector carrier 13 has a recess 14, in which flash lamp 16 is held by means of a socket 15. Reflector 13 is capable of being turned and swung by means of tube 11, which is telescopically displaceable in tube 10, and can be adjusted to lie against the front wall of battery casing 1 and form a closed unit with the latter, when the camera is separated from the casing. If the camera is fastened to casing 1, reflector 13 can be likewise adjusted, by turning and telescoping tube 11, to lie either against the front side of the camera, or, if the latter is arched, against the front wall of casing 1. Connection of the current-conducting elements can be effected either by lead 17 provided with a plug which is fastened in conventional manner at the flash lamp nipple of the camera shutter or by socket 18 which requires a suitable connecting element of the camera 6. For taking pictures, release of the flash lamp is effected in conventional manner by the shutter synchronizer.

Figure 4:
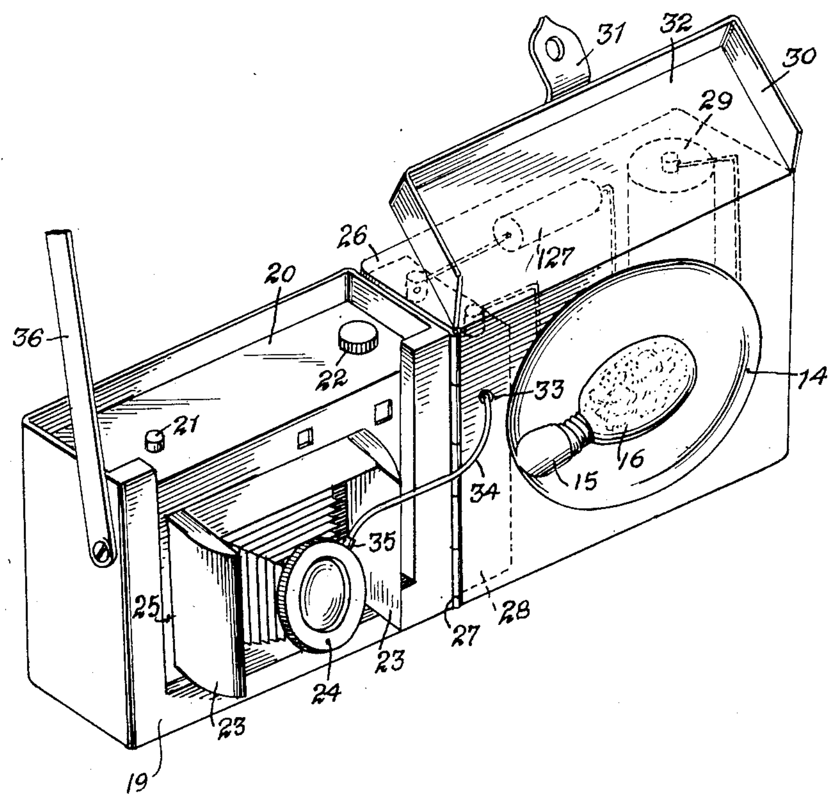
Figure 4 illustrates a flash-lamp device forming part of an eveready case which houses the photographic camera.

Figure 4 illustrates an arrangement, in which the flash lamp device forms part of an eveready case for the photographic camera. Part 19 of the case houses camera 20. 21 is the release knob and 22 the film spool knob. Camera cover parts 23 and objective 24 project outward in taking position through cut-out 25 of the case. Part 26, which covers the front part of the case in closed position, is flexibly connected with part 19 by means of hinge 27. Part 26 forms a container and contains the accessory elements of the flash lamp device, such as battery 28, resistance 127, condenser 29, indicated in dotted lines, and other elements not shown in the drawing. As far as possible, these parts are arranged in corners around the round reflector 14, in order to best utilize the space, so that the depth of container part 26 behind the reflector can be kept low. A folding cover 32 provided with edge 30 and closing flap 31 is provided at the upper front edge of container part 26. After closing camera cover parts 23, the case can be closed by folding together case parts 19 and 26, whereby cover 32 reaches beyond the upper edge of part 19 and covers the top of the camera. Electrical connection of the flash lamp device with the camera is effected by cable 34 emerging from opening 33, the end of said cable 34 being inserted in the flash lamp nipple of the camera shutter. 36 is the carrying strap which is partly broken away.

Fig. 5 illustrates likewise a flash bulb device, in which first case part 37 is divided by partition 101 into spaces 102 and 103. The lower space 103 contains a battery 28, resistance 127, condenser 29 and wires connecting these parts with each other. The upper space 102 houses the photographic camera 20. In open condition of the case, camera cover 23 and objective 24 project outward through cut-out 38, as in Fig. 4. Reflector carrier 13 is fastened to case part 37 by means of hinges 39, a cover 40 being provided at the upper edge of element 13. Both parts 13 and 40 are provided with edges 41, 42, which overlap the edges of case 37, in closed position of the device. 43 denotes a snap fastener and 44 the carrying strap for the case. Lamp-holder 15 for flash bulb 16 is provided in a corner in recess 14 of the reflector. The lamp-holder is arranged in a corner of the reflector, because there is sufficient space for electric wires and the like. Electric connection between the parts located in space 103 and shutter nipple 35 for the flash bulb is brought about by a plug connection 104 fixedly arranged in partition 101 and a registering contact 105 fixedly arranged on the bottom of the camera. The position of members 104 and 105 relative to each other is selected in such a manner that upon placing camera 20 in case part 37, member 105 automatically enters plug connection 104, whereby an electric connection is brought about. From member 105 a cable 106 arranged within the camera, leads to shutter nipple 35. The electric connection between flash bulb 16 and the parts located in space 103 is brought about by cable 45 connected to lamp-holder 15.

Figure 6:
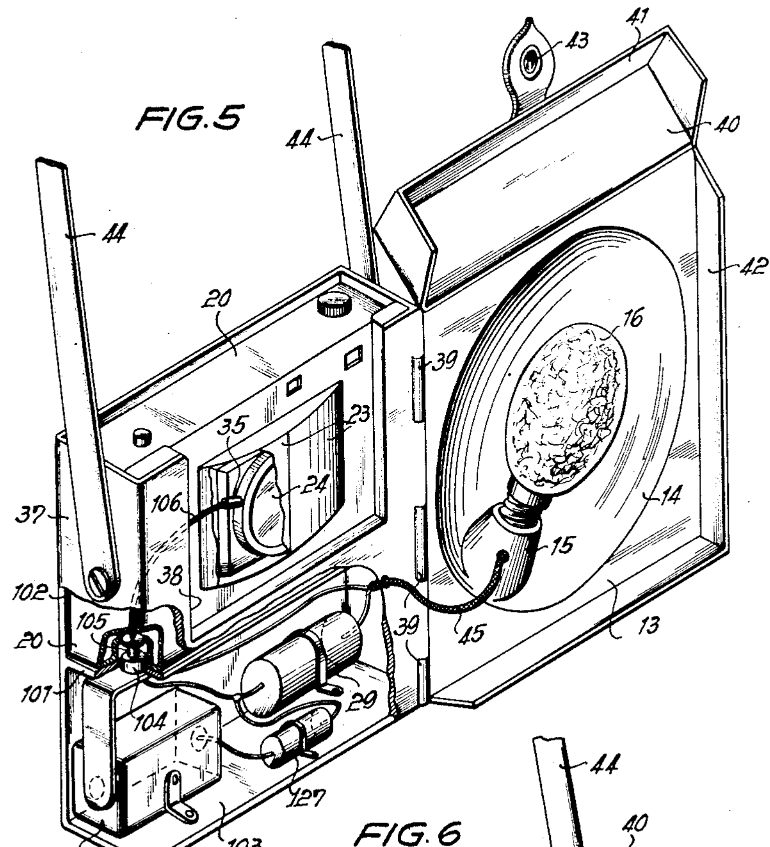
Figure 6 shows the same device in closed position.

Figure 6 shows the case in closed position, in which reflector carrier 13 lies against the front wall of case 37 and cover 40 rests on the case.

In the embodiment shown in Figures 7–9, the flash lamp device and its parts form likewise essential elements of an eveready case. 46 denotes that part of the case which houses camera 20. Like in the embodiment illustrated in Figures 4 and 5, camera cover parts 23 and objective 24 project forward from the case only in taking position. In rest position part 46 of the case is flat on all sides. A box-like part 48 is arranged under part 46 and connected with the latter by means of hinge 47. This box-like part can be fastened by means of hinged lever 49 and pins 50. A plate, or the like, 51 projects forward—i. e. in the direction of the photographic object—at the upper front edge of part 46, and reflector 13 is held by said plate 51, by means of a hinge 52. The reflector has a recess 14 and lamp-holder 15 and flash bulb 16 are arranged in said recess. The reflector has an edge 53 on three sides and a snap fastener 54 is provided on this edge. A cover 55 having an edge 56, is provided behind said projecting plate 51 and said cover is set up in operative position when camera parts have to be actuated. Coupling means 57 (see Fig. 8) is arranged in mutual engagement between cover 55 and reflector 13, and this coupling holds the reflector as well as cover 55 in erected vertical position, when the device is in open operative position. Instead of a rigid connection of cover and reflector, connecting means of other type can be used, particularly connecting means, in the use of which the reflector can be adjusted in inclined position relative to the object, in accordance with the distance. The manner of folding the case will be understood from the side view of Figure 8. First, connection 49, 50 is released, by shifting lever 49. Battery part 48 is now folded upward in the direction of the arrow, until it lies against the front wall of camera 20, under plate 51. Upon releasing coupling 57, reflector 13 is turned forward and downward in the direction of the arrow, and fastened by means of snap fastener 54. Cover 55 can be closed before or after that.

Figure 9 illustrates the eveready case comprising the camera and the flash light device, in closed condition.

Figures 10 and 11 illustrate a somewhat different flash light device in combination with an eveready case. The upper part of case 58 houses camera 20, while the source of current, i. e. a battery or an accumulator, the condenser, resistance elements and other electrical accessories are housed by the lower part of the case. A long guide tube 59 is fastened to each side of the case 58. These tubes are terminated somewhat below the upper edge of the case and are located somewhat behind the front edges in order to leave space for the edges of the cover. Guide bars 60 are movable in tubes 59 and there is sufficient friction between said bars 60 and tubes 59 to hold the bars in any desired height. The outer ends of bars 60 are provided with loops 61, through which an axle 62 is passed. This axle is journalled in an opening passing from end to end of reflector 13 and has on one end a knurled nut 63, by means of which the axle can be adjusted to any desired, inclined position of the reflector. Reflector 13 has a surface which comprises reflector recess 14 and is provided with a projecting relatively short part 64. These surfaces are framed by cornice 65, except one edge which is left free. A flash tube 66 is inserted in socket 15 of the reflector. The electrical connections between lamp holder 15 and the battery etc., are not shown. They can be arranged according to the embodiment described above or in other known, suitable manner. In order to open the closed device shown in Figure 11, first reflector 13, which forms the front cover, is moved upward in the direction of the arrow. Thereby, rods 60 glide upward in their guide tubes 59. When this upward movement is at least equal to the width of bent surface 64, the entire reflector can be caused to swing about axle 62, so that recess 14 of reflector 13 and flash tube 66 are in the taking direction. Depending on the distance of the object to be photographed, the reflector can be adjusted to a more or less inclined position and fastened there by means of knurled nut 63.

In the arrangement illustrated in Figure 12, a so-called tube camera 67 is connected in a manner known by itself, with a flat lower part 68 serving as a container. This lower part serves primarily for receiving flat battery 69. Such batteries, which are often used in hearing aids, have a relatively high voltage, for example 22 volts, in spite of their relatively small size and flat form. The use of such batteries in flash light devices is of particular advantage, because the space for the batteries can be kept flat, as shown in Figure 12. The battery is indicated at 69 below the camera 67. A longitudinally extending hinged member 70 is provided on the lower part of container 68. The lower end of a bar 71 is inserted in said hinge and rectangular reflector 13 is fastened to bar 71. Lamp socket 15, in which flash bulb 16 is inserted, is fastened to recess 14 of the reflector. A locking element 73 is fastened to an edge of the reflector by means of hinge 72. Said locking element is provided with hole 74 and can be engaged by pin 75 in closed position of the reflector in order to hold the reflector in this position. In its closed position, the reflector lying against the camera serves as a cover which receives in its recess the projecting elements of the camera, i. e., in the embodiment shown, tube 76 and objective 77.

The closed position of the reflector at the camera is diagrammatically illustrated in Figure 13.

The reflector can be removed from lower part 68 and thus from the camera. The object of this is to remove the source of light from the camera and apply the flash light at a point spaced from the location of the camera. In order to separate the reflector from the assembly, knurled nut 78, which is arranged on the lower, threaded end of bar 71, must be removed. The electrical connections between camera, flash light device and reflector and other accessory parts are not shown, as they do not form part of the present invention. 79 is the release knob and 80 the film spool knob of the camera.

Figures 14–19 illustrate diagrammatically some embodiments of the light-collecting organ, i. e. the flash light reflector. In contrast to the conventional round, cup-shaped reflectors, the reflectors shown in Figures 14–19 are unsymmetrically curved, because they are used as cover elements for the front side of the camera, or for the camera and additional parts of the case and they are, therefore, not square, but have an elongated rectangular form. Figures 14 and 15 show a tub-shaped reflector 81, the light-collecting surface of which shows different curvatures 82, 83, 84 in the direction of its two axes, curve 84 extending in the direction of its width and curve 83 longitudinally. These two curvatures have been selected in order to obtain in the reflector a distribution of light, which is adapted to the image field to be illuminated. All reflectors used in carrying out the invention should meet this condition, if possible.

Figures 16–19 illustrate other reflector designs, to which, of course, any number of further examples could be added. Reflector 85 shown in Figure 16 is tub-shaped, and shows a specific curve 86 in longitudinal direction and another curve 87 in the direction of its width (see Fig. 17). It shows straight flattening at the longitudinal ends, at 88. Reflector 89 shown in Figures 18, 19 has a longitudinally extending cylindrical curvature 90, and inclined frontal surfaces 91.

The term "adapted to be connected with a photographic camera" is used in the present application to include temporary as well as permanent connections with the camera, and the term "adapted to lie against the camera body" is used to include parts or surfaces lying directly or indirectly against the camera body or camera. The term "eveready case" is used to denote a camera case preferably with drop front and opening, which permits use of the camera without removal from the case. Finally, the term "flexibly connected" is used to denote parts, members, etc. connected by means of a hinge or other element, permitting movement of the connected parts or the like, relative to each other.

It will be understood that this invention is not limited to the parts, elements, steps, designs, constructions etc. specifically described above and illustrated in the drawings, and can be carried out with various modifications without departing from the scope of the invention, as defined in the appended claims.

What is claimed is:

1. In combination with a photographic camera, a flash lamp device and a carrying or eveready case for said camera and for said flash lamp device having an associated reflector, said case comprising a first casing part housing in its bottom part the electrical accessory elements of the flash lamp device, and the camera in its upper part, said first casing part having a back wall, side walls, a bottom wall and a front wall provided with a cut-out for the camera objective, and a second casing part carrying said light reflector and adapted to form a front and top cover for the casing; an axle means fixedly received by a tubular opening of the light reflector, said axle means extending beyond the sides of the second casing part; rods telescopically movable in tubes fastened to the first casing part for rotatably holding the ends of said axle which are rotatably mounted in hinge means at the ends of the rods; the second casing part being movable by lifting said rods from a rest or closed position, in which the second casing part substantially completely covers said front wall, to an elevated position, in which the second casing part can be caused to swing about said axle to a position, in which it is substantially aligned with the first casing part.

2. In a photographic device, in combination with an eveready case, a photographic camera and a complete flash lamp device having an associated concave reflector, said lamp device being separable from said camera; said case comprising a first casing part for removably housing the camera, said first casing part having a back wall, side walls, a bottom wall and a front wall which is provided with a cut-out for the objective of the camera, and also comprising a second casing part for housing the concave light reflector of the flash lamp device, said concave light reflector being fastened to said second casing part with the flash lamp and the concave reflector facing the open side of said second casing part; said second casing part being hinged to said first casing part and capable of swinging from assembled, closed position of said first and second casing parts, in which the camera as well as the flash lamp device are enclosed by the eveready case and the second casing part forms a complete cover for the first casing part and in which the concave reflector overlies said cut-out in said front wall and hence is adapted to have its concave surface overlie said objective to an operative open position in which the open side of the last mentioned casing part is substantially aligned with the front side of the first mentioned casing part so that the light reflector points with its open side to picture-taking direction, and vice versa; said concave light reflector lying with its open side against the front wall of the first casing part in closed position of the eveready case; the camera, as well as the flash lamp device, being adapted to be brought to picture-taking position by swinging the second casing part to open position.

3. A photographic device as claimed in claim 2, in which the electrical accessory parts of the flash lamp device are housed by the second casing part.

4. A photographic device as claimed in claim 2, in which the electrical accessory parts of the flash lamp device are housed by the first casing part.

5. A photographic device as claimed in claim 2, in which the first casing part houses in its bottom portion the electrical accessory elements of the flash lamp device and houses the camera in its upper part.

6. A photographic device as claimed in claim 2, in which the second casing part has a flap adapted to form a front and top cover for the first casing part.

7. A photographic device as claimed in claim 2, in which the reflector has a non-circular shape adjusted to the design of the front wall of the first casing part, in order to adapt distribution of the light to the surface to be illuminated.

References Cited in the file of this patent

UNITED STATES PATENTS

| | | |
|---|---|---|
| 1,272,635 | De Marco | July 16, 1918 |
| 2,290,307 | Wicker | July 21, 1942 |
| 2,388,995 | Pollock | Nov. 13, 1945 |
| 2,697,390 | Kindelberger | Dec. 21, 1954 |

FOREIGN PATENTS

| | | |
|---|---|---|
| 373,360 | Great Britain | May 26, 1932 |
| 640,784 | Germany | Dec. 23, 1933 |